US012647549B2

(12) United States Patent
Da Veiga et al.

(10) Patent No.: US 12,647,549 B2
(45) Date of Patent: Jun. 2, 2026

(54) DEPTH OF FIELD IN VIDEO BASED ON GAZE

(71) Applicant: Apple Inc., Cupertino, CA (US)

(72) Inventors: Alexandre Da Veiga, San Francisco, CA (US); Timothy T. Chong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 18/377,101

(22) Filed: Oct. 5, 2023

(65) Prior Publication Data

US 2024/0040099 A1      Feb. 1, 2024

Related U.S. Application Data

(63) Continuation of application No. PCT/US2022/024322, filed on Apr. 12, 2022.

(60) Provisional application No. 63/174,572, filed on Apr. 14, 2021.

(51) Int. Cl.
| | |
|---|---|
| *H04N 13/128* | (2018.01) |
| *G06F 3/01* | (2006.01) |
| *G06T 7/593* | (2017.01) |
| *H04N 13/383* | (2018.01) |
| *H04N 13/00* | (2018.01) |

(52) U.S. Cl.
CPC ........... *H04N 13/128* (2018.05); *G06F 3/013* (2013.01); *G06T 7/593* (2017.01); *H04N 13/383* (2018.05); *H04N 2013/0081* (2013.01)

(58) Field of Classification Search
CPC .............. H04N 13/128; H04N 13/383; H04N 2013/0081; G06T 7/593; G06F 3/01

USPC .......................................................... 382/154
See application file for complete search history.

(56) References Cited

U.S. PATENT DOCUMENTS

| | | | | |
|---|---|---|---|---|
| 8,786,675 B2 * | 7/2014 | Deering | ............... | G02B 27/017 |
| | | | | 348/51 |
| 9,678,929 B2 | 6/2017 | Andriotis et al. | | |
| 9,848,186 B2 | 12/2017 | Aguirre-Valencia | | |

(Continued)

FOREIGN PATENT DOCUMENTS

| | | | | | |
|---|---|---|---|---|---|
| WO | WO-2017059490 A1 * | 4/2017 | ............... | G06T 7/80 |

OTHER PUBLICATIONS

European Patent Office (EP/ISA), International Search Report and Written Opinion of the International Searching Authority, International Application No. PCT/US2022/024322, 14 pages, Jul. 7, 2022.

(Continued)

*Primary Examiner* — Gabriel I Garcia
(74) *Attorney, Agent, or Firm* — Thompson Hine LLP

(57) ABSTRACT

Various implementations disclosed herein include devices, systems, and methods that modify a video to enable replay of the video with a depth-based effect based on gaze of a user during capture or playback of the video. For example, an example process may include tracking a gaze direction during a capture or a playback of a video, wherein the video includes a sequence of frames including depictions of a three-dimensional (3D) environment, identifying a portion of the 3D environment depicted in the video based on the gaze direction, determining a depth of the identified portion of the 3D environment, and modifying the video to enable replay of the video with a depth-based effect based on the depth of the identified portion.

16 Claims, 7 Drawing Sheets

400

(56) References Cited

U.S. PATENT DOCUMENTS

| | | | |
|---|---|---|---|
| 2011/0228051 A1* | 9/2011 | Dedeoglu | H04N 13/128 |
| | | | 348/51 |
| 2014/0368537 A1* | 12/2014 | Salter | G06F 3/011 |
| | | | 345/633 |
| 2016/0080734 A1* | 3/2016 | Aguirre-Valencia | G06T 3/40 |
| | | | 348/51 |
| 2020/0128232 A1 | 4/2020 | Hwang et al. | |
| 2020/0402248 A1 | 12/2020 | Siver et al. | |
| 2021/0014408 A1 | 1/2021 | Timonen et al. | |
| 2021/0084278 A1* | 3/2021 | Harviainen | H04N 13/332 |

OTHER PUBLICATIONS

Shih, S-W and Liu, J., "A Novel Approach to 3-D Gaze Tracking Using Stereo Cameras," ProQuest (Technology Collection Databases, Dissertations and Theses Database), 27 pages, 2003 http://erdos.csie.ncnu.edu.tw/~stone/publication/TR-M3LAB-2002-001.pdf.

"Wondershare UniConverter, Your Complete Video Solution," 8 pages, 2012 https://videoconverter.wondershare.com/convert/convert-stereo-to-mono.html.

* cited by examiner

400

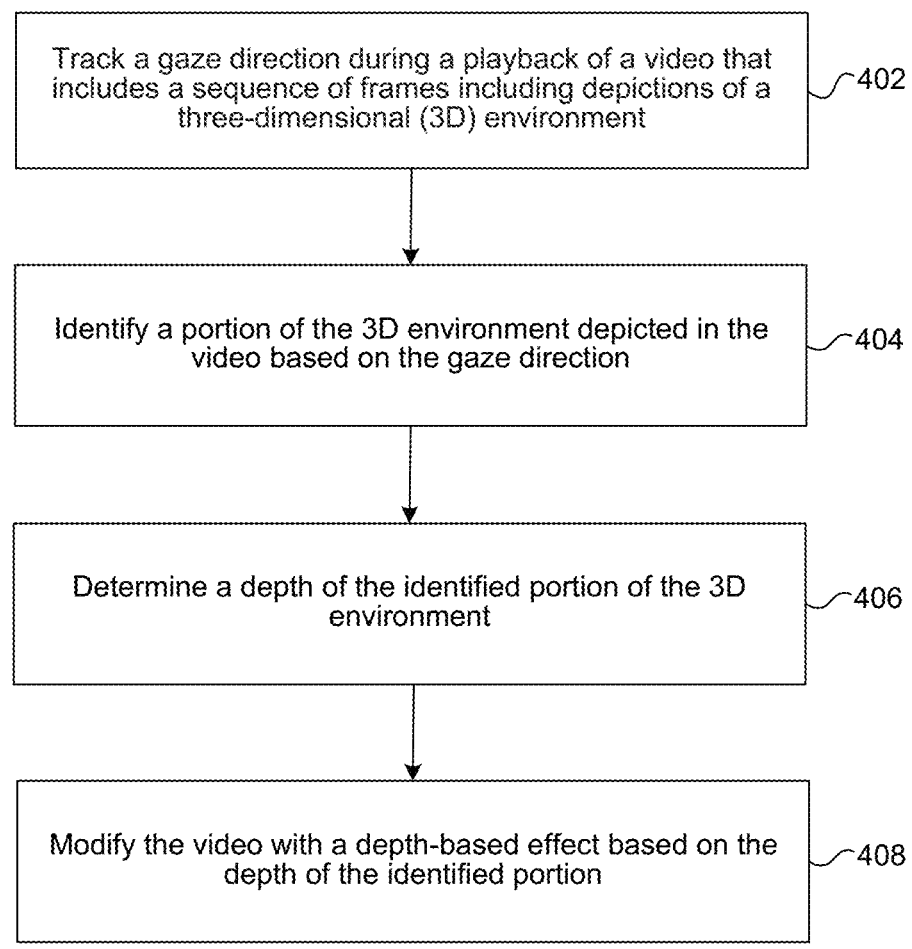

Track a gaze direction during a playback of a video that includes a sequence of frames including depictions of a three-dimensional (3D) environment ⌐402

Identify a portion of the 3D environment depicted in the video based on the gaze direction ⌐404

Determine a depth of the identified portion of the 3D environment ⌐406

Modify the video with a depth-based effect based on the depth of the identified portion ⌐408

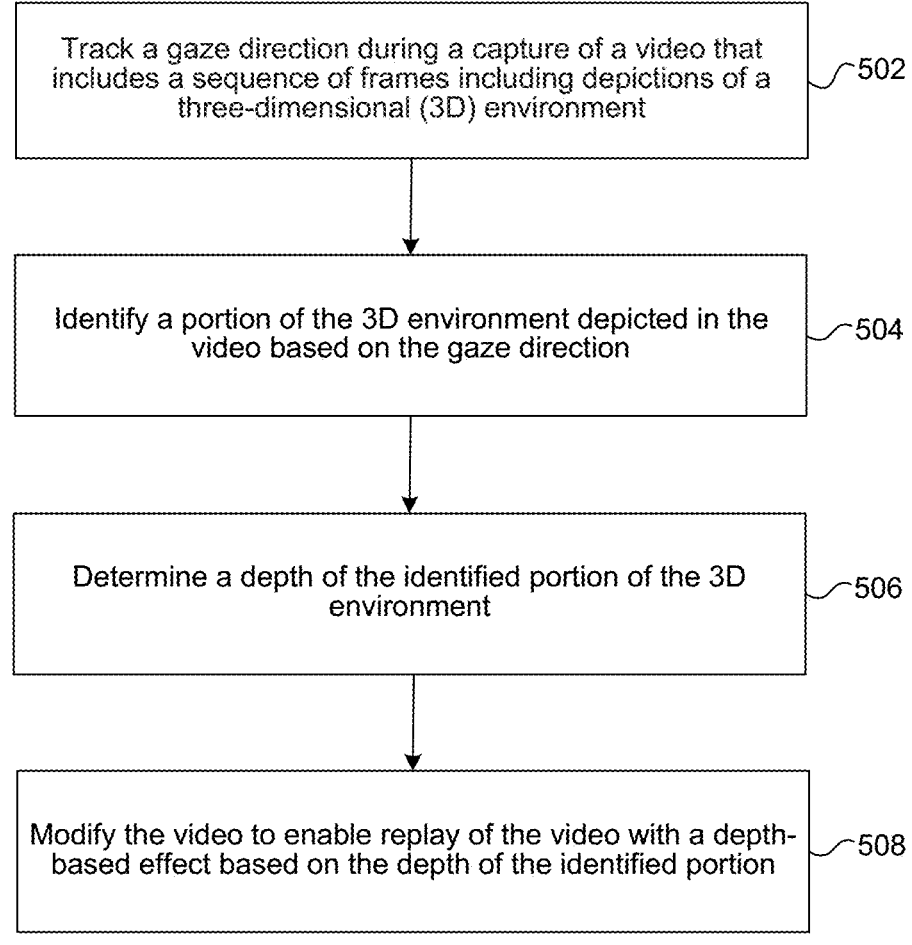

Track a gaze direction during a capture of a video that includes a sequence of frames including depictions of a three-dimensional (3D) environment ⌒502

Identify a portion of the 3D environment depicted in the video based on the gaze direction ⌒504

Determine a depth of the identified portion of the 3D environment ⌒506

Modify the video to enable replay of the video with a depth-based effect based on the depth of the identified portion ⌒508

FIG. 5

Device 600

DEPTH OF FIELD IN VIDEO BASED ON GAZE

CROSS-REFERENCE TO RELATED APPLICATIONS

This patent application is a continuation of International Application No. PCT/US2022/024322 filed Apr. 12, 2022, which claims the benefit of U.S. Provisional Application No. 63/174,572 filed Apr. 14, 2021, entitled "DEPTH OF FIELD IN VIDEO BASED ON GAZE," each of which is incorporated herein by this reference in its entirety.

TECHNICAL FIELD

The present disclosure generally relates to displaying videos with electronic devices, and in particular, to systems, methods, and devices for modifying videos for views of three-dimensional (3D) environments using eye characteristic information (e.g., gaze).

BACKGROUND

Depth-based effects are used in videos for various purposes. For example, a video having a depth of field effect may include a clear view of a person and a relatively blurry view of the background behind the person, so that a viewer of the video naturally focuses more on the person than on objects in the background. Existing techniques may not adequately facilitate the creation and viewing of videos having depth-based effects.

SUMMARY

Some implementations disclosed herein provide systems and methods for creating and/or viewing videos having depth-based effects. A depth-based effect is created based on identifying a portion (e.g., an object) of a video and applying a depth-based effect based on the identified portion. For example, based on identifying a person in a video, various other portions of the video may be provided with a blurry appearance to provide a depth of field effect. A system or method may provide a video recording or video viewing experience in which a user specifies depth-based effects by identifying portions of a 3D environment at different points in time within the video. For example, as each frame is captured or viewed, the user identifies an object of the respective frame for use in providing the depth-based effect in that respective frame. The object may be identified based on the user's gaze during the recording or viewing experience. Accordingly, in some implementations, gaze tracking is used to create videos with a depth of field effect (i.e., clear objects within a certain depth range and blurred object at other depths). During video capture or video playback, a user's gaze is tracked and used to identify a portion of the 3D environment depicted in the video (e.g., the object the user is looking at most). The video is modified to enable replay with a depth of field effect based on the depth of the identified portion. In some implementations, a video may be recorded in a stereoscopic form and converted to a monoscopic form that includes a depth-based effect that is applied based on gaze-identified portions of the 3D environment depicted in the video.

In general, one innovative aspect of the subject matter described in this specification can be embodied in methods that include the actions of tracking a gaze direction during a capture or a playback of a video, wherein the video includes a sequence of frames including depictions of a three-dimensional (3D) environment, identifying a portion of the 3D environment depicted in the video based on the gaze direction, determining one or more depths of the identified portion of the 3D environment, and modifying the video to enable replay of the video with a depth-based effect based on the one or more depths of the identified portion.

These and other embodiments can each optionally include one or more of the following features.

In some aspects, the video is a stereoscopic video including a pair of images for each frame of the video. In some aspects, modifying the video includes exporting the video as a monoscopic video having a single image for each frame of the video. In some aspects, one or more depths of the identified portion of the 3D environment are determined based on the stereoscopic video. In some aspects, the identified portion of the 3D environment is an object.

In some aspects, the portion of the 3D environment is identified during capture of the video based on the gaze being directed towards the portion of the environment or towards a corresponding portion of a display that shows a live preview of the 3D environment being captured. In some aspects, the portion of the 3D environment is identified based on the gaze at a first time during the video, wherein the method further includes identifying a second portion of the 3D environment based on the gaze at a second time during the video, and modifying the video to enable replay of the video with a second depth-based effect based on a second depth of the second identified portion.

In some aspects, identifying the portion of the 3D environment includes identifying a plurality of objects based on the gaze direction during a period of time, determining confidence values corresponding to likelihood that attention is directed to each of the plurality of objects based on the gaze direction during the period of time, and identifying the portion of the 3D environment by identifying an object of the plurality of objects based on the confidence values.

In some aspects, modifying the video to enable replay of the video with a depth-based effect based on the one or more depths of the identified portion includes modifying the frames of the sequence of frames to apply a depth of field effect and storing the modified frames as the modified video. In some aspects, modifying the video to enable replay of the video with a depth-based effect based on the one or more depths of the identified portion includes storing in the video an identification of the identified portion of the 3D environment or the one or more depths of the identified portion, wherein the stored identification or one or more depths can be used during replay to generate the depth-based effect.

In some aspects, the depth-based effect varies over time based on identifying multiple portions of the 3D environment gazed upon at different times during the capture or the playback of the video. In some aspects, tracking the gaze direction during the playback of the video includes tracking a pixel on a display that the gaze is focused upon. In some aspects, the 3D environment is a physical environment, a representation of a physical environment, or an extended reality (XR) environment that is presented to a user. In some aspects, the electronic device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of an exemplary method that modifies of a video with depth-based effects during playback of the video in accordance with some implementations.

FIG. 5 is a flowchart representation of an exemplary method that modifies of a video to enable replay with depth-based effects during playback of the video in accordance with some implementations.

Figure 1:
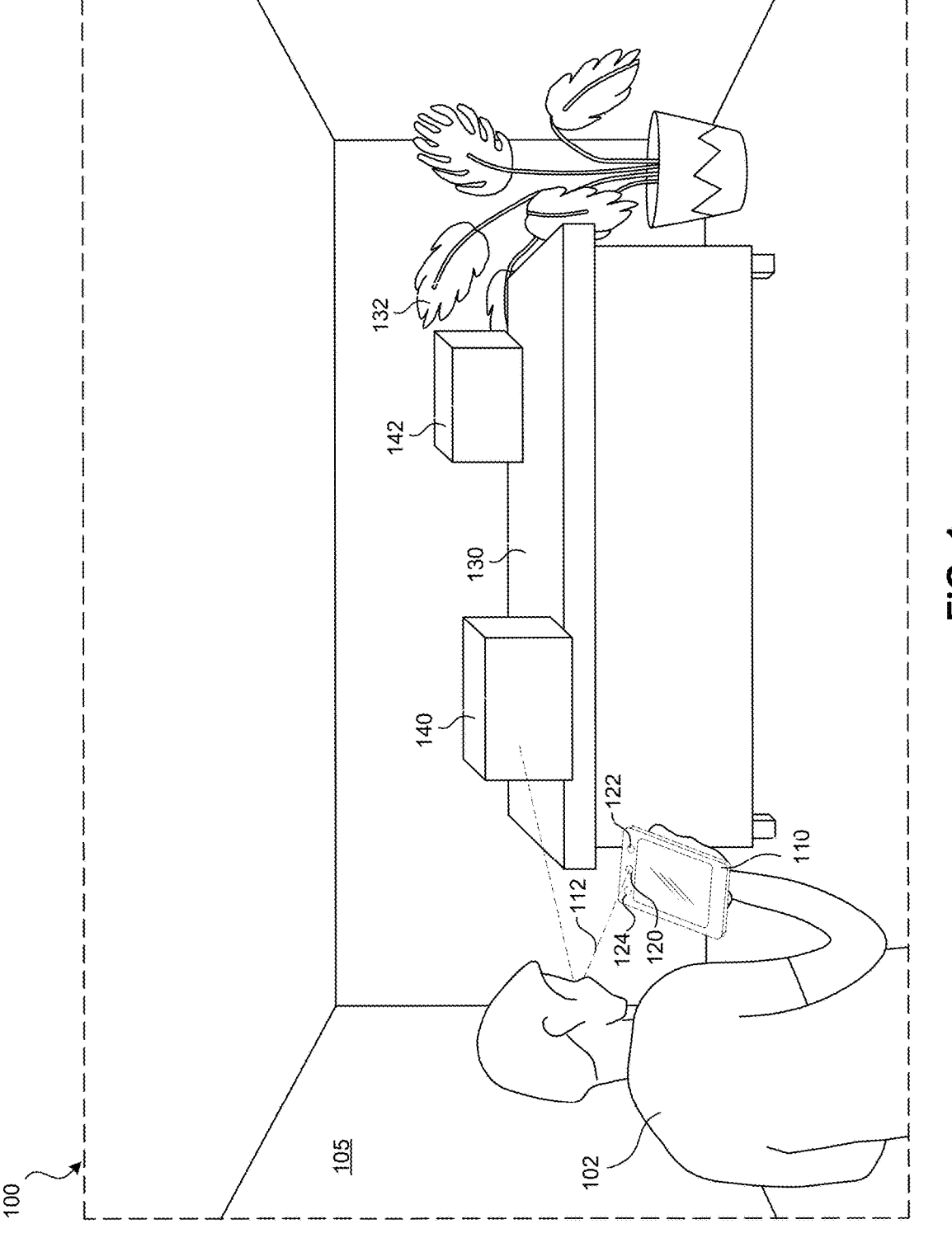
FIG. 1 is an example of a device used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an exemplary operating environment 100 in accordance with some implementations. In this example, the example operating environment 100 involves an exemplary physical environment 105 that includes physical objects such as desk 130, plant 132, a first object 140, and a second object 142. Additionally, physical environment 105 includes user 102 holding device 110. As illustrated, the user's gaze is towards the first object 140, which happens to be closer to the user 102 (e.g., on top of and towards the front of the desk 130) than the second object (e.g., located more towards the back of the desk 130). In some implementations, the device 110 is configured to present a computer-generated environment to the user 102. The presented environment can include extended reality (XR) features.

In some implementations, the device 110 is a handheld electronic device (e.g., a smartphone or a tablet). In some implementations, the device 110 is a near-eye device such as a head worn device. The device 110 utilizes one or more display elements to present views. For example, the device 110 can display views that include content in the context of an extended reality environment. In some implementations, the device 110 may enclose the field-of-view of the user 102. In some implementations, the functionalities of device 110 are provided by more than one device. In some implementations, the device 110 communicates with a separate controller or server to manage and coordinate an experience for the user. Such a controller or server may be located in or may be remote relative to the physical environment 105.

In some implementations, content displayed by the device 110 may be a visual 3D environment (e.g., an XR environment), and visual characteristics of the 3D environment may continuously change. Inertial head pose measurements may be obtained by the IMU or other tracking systems. In one example, a user can perceive a real-world environment while holding, wearing, or being proximate to an electronic device that includes one or more sensors that obtains physiological data to assess an eye characteristic that is indicative of the user's gaze characteristics, and motion data of a user.

In some implementations, a visual characteristic is displayed as a feedback mechanism for the user that is specific to the views of the 3D environment (e.g., a visual or audio cue presented during the viewing). In some implementations, viewing the 3D environment can occupy the entire display area of display. For example, the content displayed may be a sequence of images that may include visual and/or audio cues presented to the user (e.g., 360-degree video on a head mounted device (HMD)).

The device 110 obtains physiological data (e.g., pupillary data) from the user 102 via a sensor 120. For example, the device 110 obtains eye gaze characteristic data 112 via sensor 120. In particular, as illustrated in FIG. 1, the user 102 has focused his or her gaze (e.g., eye gaze characteristic data 112) on the first object 140. While this example and other examples discussed herein illustrate a single device 110 in a real-world environment 105, the techniques disclosed herein are applicable to multiple devices as well as to other real-world environments. For example, the functions of device 110 may be performed by multiple devices.

In some implementations, as illustrated in FIG. 1, the device 110 is a handheld electronic device (e.g., a smartphone or a tablet). In some implementations, the device 110 is a wearable HMD. In some implementations the device 110 is a laptop computer or a desktop computer. In some implementations, the device 110 has a touchpad and, in some implementations, the device 110 has a touch-sensitive display (also known as a "touch screen" or "touch screen display").

In some implementations, the device 110 includes sensors 122 and 124, located on the back face of the device 110, for acquiring image data of the physical environment (e.g., as the user 102 views the environment). The image data can include light intensity image data and/or depth data. For example, sensor 122 may be a video camera for capturing RGB data, and sensor 124 may be a depth sensor (e.g., a structured light, a time-of-flight, or the like) for capturing depth data. The image sensors 122, 124, and the like, may include a first light intensity camera that acquires light intensity data for the left eye viewpoint and a second light intensity camera that acquires light intensity data for the right eye viewpoint of the physical environment. Additionally, the image sensors 122, 124, and the like, may include a first depth camera that acquires depth image data for the left eye viewpoint and a second depth camera that acquires depth image data for the right eye viewpoint of the physical environment. Alternatively, one depth sensor is utilized for both depth image data for the left eye viewpoint and the right eye viewpoint. Thus, the depth data is equivalent. Alternatively, the depth data can be determined based on the light intensity image data, thus not requiring a depth sensor.

In some implementations, the device 110 includes an eye tracking system for detecting eye position and eye movements (e.g., eye gaze characteristic data 112). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 102 (e.g., via sensor 120). Moreover, the illumination source of the device 110 may emit NIR light to illuminate the eyes of the user 102 and the NIR camera may capture images of the eyes of the user 102. In some implementations, images captured by the eye tracking system may be analyzed to detect position and movements of the eyes of the user 102, or to detect other information about the eyes such as pupil dilation or pupil diameter. Moreover, the point of gaze estimated from the eye tracking images may enable gaze-based interaction with content shown on the display of the device 110.

In some implementations, the device 110 has a graphical user interface (GUI), one or more processors, memory and one or more modules, programs or sets of instructions stored in the memory for performing multiple functions. In some implementations, the user 102 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 110 employs various physiological sensor, detection, or measurement systems. In an exemplary implementation, detected physiological data includes inertial head pose measurements determined by an IMU or other tracking system. In some implementations, detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 110 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, the location and features of the head of the user 102 (e.g., an edge of the eye, a nose or a nostril) are extracted by the device 110 and used in finding coarse location coordinates of the eyes of the user 102, thus simplifying the determination of precise eye features (e.g., position, gaze direction, etc.) and making the gaze characteristic(s) measurement more reliable and robust. Furthermore, the device 110 may readily combine the 3D location of parts of the head with gaze information obtained via eye part image analysis in order to identify a given on-screen object at which the user 102 is looking at any given time. In some implementations, the use of 3D mapping in conjunction with gaze tracking allows the user 102 to move his or her head and eyes freely while reducing or eliminating the need to actively track the head using sensors or emitters on the head.

By tracking the eyes, some implementations reduce the need to re-calibrate the user 102 after the user 102 moves his or her head. In some implementations, the device 110 uses depth information to track the pupil's movement, thereby enabling a reliable present pupil diameter to be calculated based on a single calibration of user 102. Utilizing techniques such as pupil-center-corneal reflection (PCCR), pupil tracking, and pupil shape, the device 110 may calculate the pupil diameter, as well as a gaze angle of the eye from a fixed point of the head, and use the location information of the head in order to re-calculate the gaze angle and other gaze characteristic(s) measurements (e.g., measuring a gaze angle from the user 102 to the first object 140). In addition to reduced recalibrations, further benefits of tracking the head may include reducing the number of light projecting sources and reducing the number of cameras used to track the eye.

A physical environment (e.g., physical environment 105) refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figures 2A, 2B:
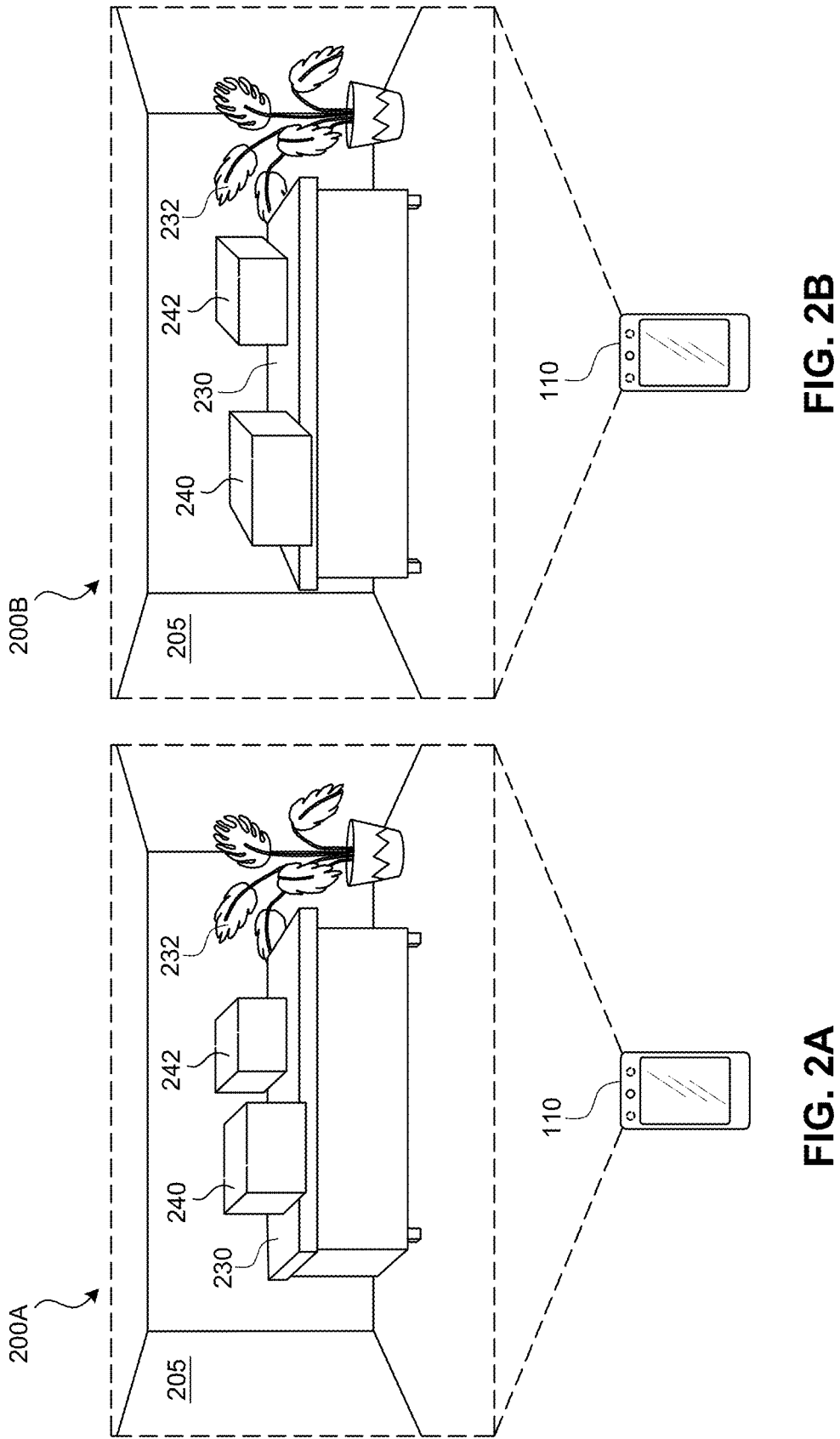
FIGS. 2A and 2B illustrate example views provided by the device of FIG. 1, the views including a left eye view and a right eye view in accordance with some implementations.

FIGS. 2A and 2B illustrate exemplary views provided by the display elements of device 110. The views present a 3D environment 205 that includes aspects of a physical environment (e.g., environment 105 of FIG. 1). In some implementations, the 3D environment 205 may partially include virtual content (e.g., an XR environment), or could be entirely virtual content (e.g., a mesh representation of the environment 105 of FIG. 1). Optionally, presenting the views of the 3D environment 205 includes presenting video pass-through or see-through images of at least a portion of a physical environment, wherein a 3D reconstruction of at least the portion of the physical environment is dynamically generated.

The 3D display data can be captured, stored, and/or displayed on the same or another device, e.g., on a device that has left eye and right eye displays for viewing stereoscopic images, such as an HMD. The first view 200A, depicted in FIG. 2A, provides a view of the physical environment 105 from a particular viewpoint (e.g., left-eye viewpoint) facing the desk 130. Accordingly, the first view 200A includes a representation 230 of the desk 130, a representation 232 of the plant 132, a representation 240 of the first object 140, and a representation 242 of the second object 142 from that viewpoint. The second view 200B, depicted in FIG. 2B provides a similar view of the physical environment 105 as illustrated in view 200A, but from a different viewpoint (e.g., right-eye viewpoint) facing a portion of the physical environment 105 slightly more towards the right of the first object 140 (e.g., the object of interest). The representations 240, 242, etc., are visible in the second view 200B, but at different locations (compared to the first view 205A) based on the different viewpoints (e.g., pupillary distance with respect to the convergence of the user's gaze upon an object of interest).

In some implementations, the device 110 may enable the system to detect a user's gaze upon the objects 140, 142 of the 3D depiction from different viewpoints, for example, by moving around to change the position of the device 110 relative to a fixed 3D location of the objects 140, 142 relative to the physical environment 105. The ability to capture a user's focus on a particular portion of the 3D environment 205 (e.g., object 240) during capture and or replay of a video may facilitate, simplify, and improve the efficiency of providing the depth-based effect process as further described herein with reference to FIGS. 3-5.

Figure 3:
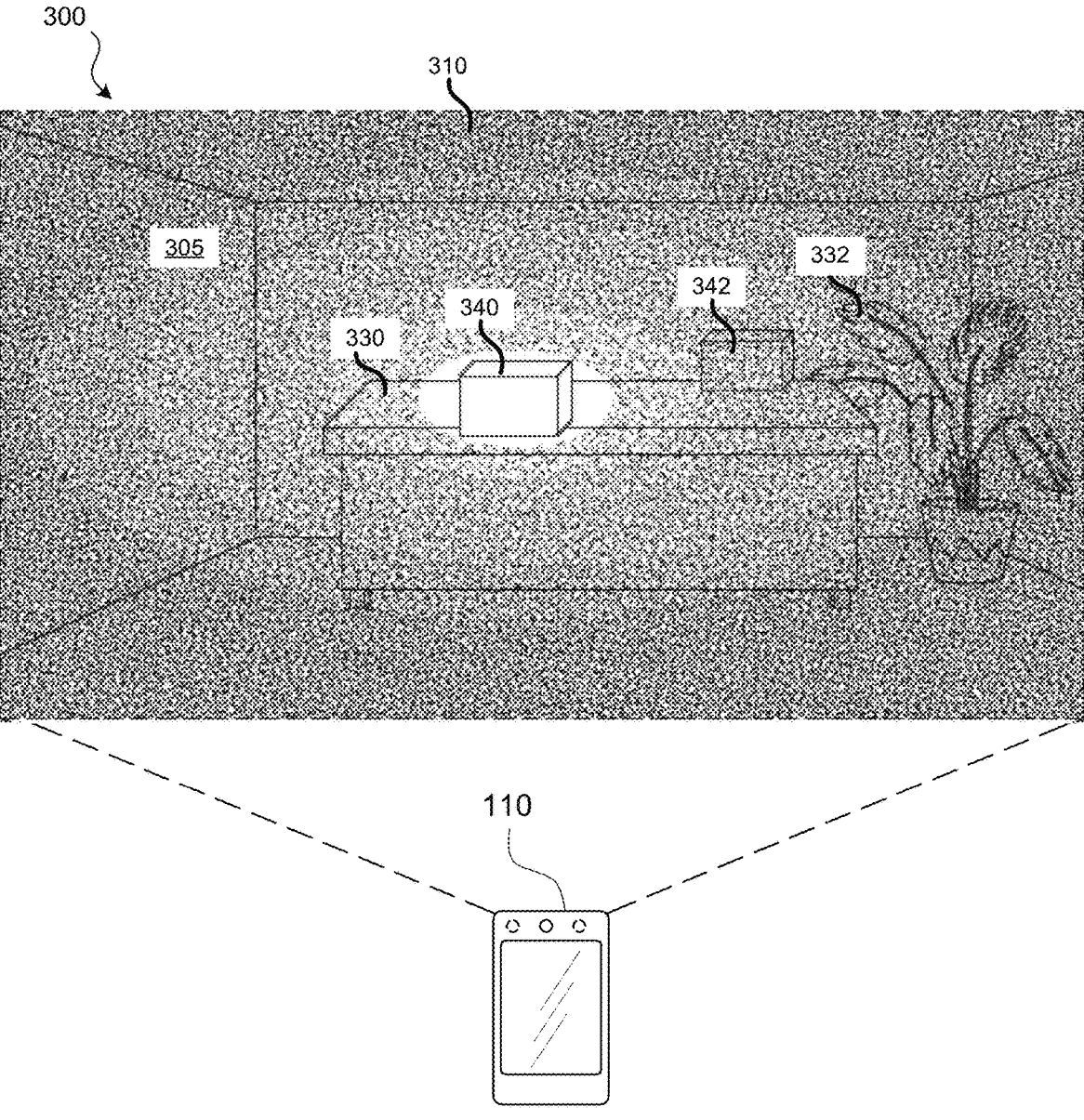
FIG. 3 illustrates an example stereoscopic view provided by the device of FIG. 1 including a depth-based effect in accordance with some implementations.

FIG. 3 illustrates an example view 300 provided by the device 110. The view presents a 3D environment 305 that includes aspects of a physical environment (e.g., environment 105 of FIG. 1) and/or virtual content (e.g., an XR environment). The 3D display data can be captured, stored, and/or displayed on the same or another device, e.g., on a device that has left eye and right eye displays for viewing stereoscopic images, such as an HMD. The view 300 provides a stereo view of the physical environment 105 from a particular viewpoint (e.g., combined left-eye view 200A and right-eye view 200B of FIGS. 2A and 2B, respectively) facing the desk 130. In some implementations, view 300 is a monoscopic (mono) view of the physical environment 105. Accordingly, the view 300 includes a representation 330 of the desk 130, a representation 332 of the plant 132, a representation 340 of the first object 140, and a representation 342 of the second object 142 from that viewpoint.

FIG. 3 illustrates a depth-based effect 310 that is centered around representation 340 of the first object 140. In particular, view 300 illustrates an example process that modifies a stereo-based video (e.g., a sequence of frames including depictions of a 3D environment) with depth-based effects around a particular region, object(s), or depth within the environment of the video while tracking a user's gaze direction either during capture of the video or tracks a user's gaze during playback of the video. For example, processes described herein (e.g., method 400 of FIG. 4 and method 500 of FIG. 5), based on tracking the user's gaze direction (e.g., eye gaze characteristic data 112 of user 102 in FIG. 1) towards the first object 140, can determine a depth of the identified portion of the 3D environment (e.g., representation 340 of the first object 140), and modify the video with a depth-based effect (e.g., depth of field) based on the depth of the identified portion. Depth-based effect 310 is an example of a halo blurring effect surrounding the representation 340 of the first object 140. Depth-based effect 310 provides the user with a focused view of the 3D environment 305 based on his or her gaze direction. Although FIG. 3 is based on a relatively "slow moving" video (e.g., two boxes on top of a desk), the video may include a fast-paced video experience. For example, the video may include a child's soccer game, and the parent, during capture or playback of the video, may try to focus his or her attention their own child within the video. Thus, using process described herein, the system, based on the parent's gaze direction toward his or her child, can provide a depth-based effect around the child as they are quickly moving throughout the game play in the video.

As illustrated in FIG. 3, the depth-based effect 310 blurs out a large portion of the remaining environment around the representation 340 of the first object 140. Alternatively, the blurring effect of depth-based effect 310 may not be as condensed as illustrated. Or the halo around the representation 340 may be larger so you can see more of the environment 305 around the representation 340. In other examples, portions of the video may be blurred based on a difference in depth from that which the user's gaze is directed. Other alternatives for generating and displaying a depth-based effect may include, but are not limited to, Gaussian smoothing, pixelization or mosaic, color manipulation and stylization, and the like.

FIG. 4 is a flowchart representation of an exemplary method 400 that modifies a video with depth-based effects while tracking a user's gaze during playback in accordance with some implementations. In some implementations, the method 400 is performed by a device (e.g., device 110 of FIG. 1), such as a mobile device, desktop, laptop, or server device. In some implementations, the device has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). The modification of a video with depth-based effects process of method 400 is illustrated with examples with reference to FIGS. 1-3.

At block 402, the method 400, at an electronic device having a processor, tracks a gaze direction during playback of a video, wherein the video includes a sequence of frames including depictions of a 3D environment. In some implementations, the video is a stereoscopic video including a pair of images for each frame of the video. For example, the original/captured video may be a stereoscopic (stereo) video or a monoscopic (mono) video. The 3D environment may be entirely the real world, entirely a virtual world (e.g., computer generated), or an XR environment that includes both physical world content and virtual content.

In some implementations, tracking the gaze direction during the playback of the video includes tracking a pixel on a display that the gaze is focused upon. In some implementations, a device (e.g., device 110) includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 110 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

At block 404, the method 400 identifies a portion of the 3D environment depicted in the video based on the gaze direction. In some implementations, the identified portion of the 3D environment is an object. For example, an object detection instruction set may be included that is configured with instructions executable by a processor to analyze sensor data to identify objects. For example, an object detection instruction set can analyze the sensor data (e.g., RGB images, a sparse depth map, and other sources of physical environment information) to identify objects (e.g., furniture, appliances, wall structures, etc.). In some implementations, the object detection instruction set can use machine learning methods for object identification. In some implementations, the machine learning method is a neural network (e.g., an artificial neural network), decision tree, support vector machine, Bayesian network, or the like. For example, the object detection instruction set uses an object detection neural network unit to identify objects and/or an object classification neural network to classify each type of object.

In some implementations, during video playback, identifying a portion (e.g., an object) of the 3D environment may involve determining that the gaze is directed directly towards the portion of the environment. Using gaze detection techniques described herein, a gaze detection system can determine that a user is directly focused on one particular object in a scene that may include multiple objects. For example, a parent may be recording their child playing in a game during capture of the video such that the gaze detection determines that the parent is focused specifically on the child during capture independent of the focus of the camera (e.g., movement of the camera during capture of a live game).

In some implementations, during video playback, identifying a portion (e.g., an object) of the 3D environment may involve determining that the gaze is directed directly towards a corresponding portion of a display that shows a live preview of what is being captured. For example, during video playback, this may involve determining that the user's gaze (e.g., gaze characteristic data 112 of user 102) is directed to a corresponding portion of a display (e.g., the display of device 110). Additionally, the "live preview" may involve showing a user, during capture of the video, a picture-in-picture display of the live video being captured. Optionally, the picture-in-picture display could further include the depth-based effect as the system determines the identified portion of the 3D environment the user is focused on (e.g., via gaze detection).

In some implementations, the portion may be identified based on confidence such that identifying the portion of the 3D environment includes identifying a plurality of objects based on the gaze direction during a period of time, determining confidence values corresponding to likelihood that attention is directed to each of the plurality of objects based on the gaze direction during the period of time, and identifying the portion of the 3D environment by identifying an object of the plurality of objects based on the confidence values. For example, identifying which of multiple objects the user has looked at the most (e.g., during a window of time). For example, returning to the example of a parent watching a game his or her child is playing in, there are multiple other children within the same scene, but based on a confidence value of the gaze direction, it can be determined what the main focus of the gaze of the parent is focused on (e.g., his or her own child).

In some implementations, the portion of the 3D environment may be identified based on gaze during an initial replay and then changed based on gaze during a subsequent replay. For example, returning to the example of a parent watching a recorded game his or her child is playing in, that parent is focused on his or her child during the replay. However, if a different parent with a different child playing in the same game within the same video is watching the subsequent replay, that different parent's gaze may be tracked during the replay of the video, and thus the gaze of that different parent could be utilized to change the focus of the user for the system processes described herein (e.g., depth based effects of FIG. 3) and the depth based effect can be updated to focus on the other child.

At block 406, the method 400 determines a depth of the identified portion of the 3D environment. For example, a distance of the object from the capturing device (e.g., the distance from device 110 and the object 140 in FIG. 1). In some implementations, depth may be determined based on sensor data from a depth sensor on the capture device. In some implementations, depth of the identified portion of the 3D environment is determined based on the stereoscopic video. For example, depth information may be determined based on stereo RGB image data, thus not requiring a depth sensor. In some implementations, depth of the identified portion of the 3D environment is determined based on the stereoscopic video.

At block 408, the method 400 modifies the video with a depth-based effect (e.g., depth of field) based on the depth of the identified portion. For example, as illustrated in FIG. 3, a halo blurring effect is added to a view surrounding the object of interest (e.g., object 140) or to portions of the view having depths other than that of the object of interest. In some examples, the amount of blur may depend on the difference in depths between a portion of the view and the object of interest.

In some implementations, the portion of the 3D environment is identified based on the gaze at a first time during the video, wherein the method 400 further includes identifying a second portion of the 3D environment based on the gaze at a second time during the video, and modifying the video to enable replay of the video with a second depth-based effect based on a second depth of the second identified portion. For example, during the first 30 seconds the user looks at person A and the next 30 seconds the user looks at person B—the depth of field effect changes accordingly.

In some implementations, modifying the video with a depth-based effect based on the depth of the identified portion includes modifying the frames of the sequence of frames to apply a depth of field effect and storing the modified frames as the modified video. For example, as illustrated in FIG. 3, a halo blurring effect is added to a view surrounding the object of interest (e.g., object 140) for the recorded video.

In some implementations, modifying the video with a depth-based effect based on the depth of the identified portion includes storing in the video an identification of the identified portion of the 3D environment or the depth of the identified portion, wherein the stored identification or depth can be used during replay to generate the depth-based effect. For example, during capture of the video, the identified portion (e.g., an object such as the first object 140) of the 3D environment is stored within the video's metadata with a timestamp that identifies the object of interest for a user during capture of the video. For example, a recorded video for a parent watching their child's game may contain metadata that would identify the object of interest for the user that captured the video (e.g., the parent), such that during replay, a depth-based effect (e.g., halo blurring effect) would be applied around the object of interest (e.g., the parent's child) based on that stored information (e.g., metadata) embedded within the video.

In some implementations, the depth-based effect varies over time based on identifying multiple portions of the 3D environment gazed upon at different times during the capture or the playback of the video. The depth-based effect may vary when switching from one object to another object. For example, in FIGS. 1-3, the user 102 may move their gaze from the first object (e.g., object 140) to the second object (e.g. object 142) at the back of the desk. For example, if a first user (a parent) is watching a particular player (e.g., their child) during a soccer game, his or her gaze is likely focused on that player. However, if a second user (another parent) watches the video, he or she may be focused on another player (e.g., their child) within the same video. The depth-based effect (e.g., halo effect) may then move to the second player based on the gaze of the second user.

Additionally, in some implementations, the depth-based effect may vary by expanding the depth range that is in focus. For example, given the aforementioned example of watching players in a soccer game between two different parents, if a user focuses on a larger area (e.g., multiple players, or the players around the soccer ball), the depth-based effect may expand further than on one player and create a larger area of the effect based on the gaze characteristics.

In some implementations, modifying the video includes exporting the video as a monoscopic video having a single image for each frame of the video. For example, the processes described herein enable a user to create higher quality mono videos from a stereo capture. For example, gaze is tracked/recorded and used in combination with stereo depth to identify a subject of interest/element of focus. A focal length can then be computed to create a depth-of-field effect when applied to mono exports of stereo captures. Providing a depth-of-field effect when applied to mono exports can augment the visual experience of a user (e.g., while wearing an HMD), and thus create better visual experience.

In some implementations, the playback of the video may include a live broadcast, such that the generation and display of the depth-based effect could be applied to a live casted television event (e.g., a live basketball game). Some latency may be required (e.g., a few frames before), but a user's gaze could be tracked as he or she is watching a live television event to determine the user's main gaze direction (e.g., subject of interest/element of focus). For example, during a live basketball game, if the user is focused on a particular player on the court at the time, a depth-based effect could be applied around that particular player as the user is tracking that player. Then, if the user changes his or her gaze direction to another player (e.g., following the basketball being passed to another player), the depth-based effect would then be transitioned to the other player. In some implementations, to provide the user with a more suitable experience, when changing the depth-based effect quickly from one object to another object (e.g., between two different players), a transition effect could be applied. For example, when it is determined that the user has moved his or her gaze from Player A to Player B, the depth-based effect could fade away from Player A, and then start to fade back in with respect to Player B.

FIG. 5 is a flowchart representation of an exemplary method 500 that modifies a video with depth-based effects while tracking a user's gaze during capture of the video in accordance with some implementations. In some implementations, the method 500 is performed by a device (e.g., device 110 of FIG. 1), such as a mobile device, desktop, laptop, or server device. In some implementations, the device has a screen for displaying images and/or a screen for viewing stereoscopic images such as an HMD. In some implementations, the method 500 is performed by processing logic, including hardware, firmware, software, or a combination thereof. In some implementations, the method 500 is performed by a processor executing code stored in a non-transitory computer-readable medium (e.g., a memory). The modification of a video with depth-based effects process of method 500 is illustrated with examples with reference to FIGS. 1-3.

At block 502, the method 500, at an electronic device having a processor, tracks a gaze direction during a capture of a video, wherein the video includes a sequence of frames including depictions of a 3D environment. In some implementations, the video is a stereoscopic video including a pair of images for each frame of the video. For example, the captured video may be a stereoscopic (stereo) video or a monoscopic (mono) video. The 3D environment may be entirely real world, entirely a virtual world (e.g., computer generated), or an XR environment that includes both physical world content and virtual content.

In some implementations, tracking the gaze direction during the capture of the video includes tracking a pixel on a display that the gaze is focused upon. In some implementations, a device (e.g., device 110) includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 110 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

At block 504, the method 500 identifies a portion of the 3D environment depicted in the video based on the gaze direction during capture of the video. In some implementations, the identified portion of the 3D environment is an object. For example, an object detection instruction set may be included that is configured with instructions executable by a processor to analyze sensor data to identify objects. For example, an object detection instruction set can analyze the sensor data (e.g., RGB images, a sparse depth map, and other sources of physical environment information) to identify objects (e.g., furniture, appliances, wall structures, etc.). In some implementations, the object detection instruction set can use machine learning methods for object identification. In some implementations, the machine learning method is a neural network (e.g., an artificial neural network), decision tree, support vector machine, Bayesian network, or the like. For example, the object detection instruction set uses an object detection neural network unit to identify objects and/or an object classification neural network to classify each type of object.

In some implementations, during video capture identifying a portion (e.g., an object) of the 3D environment may involve determining that the gaze is directed directly towards the portion of the environment. Using gaze detection techniques described herein, a gaze detection system can determine that a user is directly focused on one particular object in a scene that may include multiple objects. For example, a parent may be recording their child playing in a game during capture of the video such that the gaze detection determines that the parent is focused specifically on the child during capture independent of the focus of the camera (e.g., movement of the camera during capture of a live game).

In some implementations, during video capture identifying a portion (e.g., an object) of the 3D environment may involve determining that the gaze is directed directly towards a corresponding portion of a display that shows a live preview of what is being captured. For example, during video playback, this may involve determining that the user's gaze (e.g., gaze characteristic data 112 of user 102) is directed to a corresponding portion of a display (e.g., the display of device 110). Additionally, the "live preview" may involve showing a user, during capture of the video, a picture-in-picture display of the live video being captured.

Optionally, the picture-in-picture display could further include the depth-based effect as the system determines the identified portion of the 3D environment the user is focused on (e.g., via gaze detection).

In some implementations, the portion may be identified based on confidence such that identifying the portion of the 3D environment includes identifying a plurality of objects based on the gaze direction during a period of time, determining confidence values corresponding to likelihood that attention is directed to each of the plurality of objects based on the gaze direction during the period of time, and identifying the portion of the 3D environment by identifying an object of the plurality of objects based on the confidence values. For example, identifying which of multiple objects the user has looked at the most (e.g., during a window of time). For example, returning to the example of a parent watching a game his or her child is playing in, there are multiple other children within the same scene, but based on a confidence value of the gaze direction, it can be determined what the main focus of the gaze of the parent is focused on (e.g., his or her own child).

In some implementations, the portion of the 3D environment may be identified based on gaze during capture (e.g., a live stream recording) and then changed based on gaze during a subsequent replay. For example, returning to the example of a parent watching and recording a game his or her child is playing in, that parent is focused on his or her child during capture of the video. However, if a different parent with a different child playing in the same game within the same video is watching a replay of the video, that different parent's gaze may be tracked during the replay of the video, and thus the gaze of that different parent could be utilized to change the focus of the user for the system processes described herein (e.g., depth based effects of FIG. 3) and the depth based effect can be updated to focus on the other child.

At block 506, the method 500 determines a depth of the identified portion of the 3D environment. For example, a distance of the object from the capturing device (e.g., the distance from device 110 and the object 140 in FIG. 1). In some implementations, depth may be determined based on sensor data from a depth sensor on the capture device. In some implementations, depth of the identified portion of the 3D environment is determined based on the stereoscopic video. For example, depth information may be determined based on stereo RGB image data, thus not requiring a depth sensor. In some implementations, depth of the identified portion of the 3D environment is determined based on the stereoscopic video.

At block 508, the method 500 modifies the video to enable replay of the video with a depth-based effect (e.g., depth of field) based on the depth of the identified portion. For example, as illustrated in FIG. 3, a halo blurring effect is added to a view surrounding the object of interest (e.g., object 140) or to portions of the view having depths other than that of the object of interest. In some examples, the amount of blur may depend on the difference in depths between a portion of the view and the object of interest.

In some implementations, the portion of the 3D environment is identified based on the gaze at a first time during the video, wherein the method 500 further includes identifying a second portion of the 3D environment based on the gaze at a second time during the video, and modifying the video to enable replay of the video with a second depth-based effect based on a second depth of the second identified portion. For example, during the first 30 seconds the user looks at person A and the next 30 seconds the user looks at person B—the depth of field effect changes accordingly.

In some implementations, modifying the video to enable replay of the video with a depth-based effect based on the depth of the identified portion includes modifying the frames of the sequence of frames to apply a depth of field effect and storing the modified frames as the modified video. For example, as illustrated in FIG. 3, a halo blurring effect is added to a view surrounding the object of interest (e.g., object 140) for the recorded video.

In some implementations, modifying the video to enable replay of the video with a depth-based effect based on the depth of the identified portion includes storing in the video an identification of the identified portion of the 3D environment or the depth of the identified portion, wherein the stored identification or depth can be used during replay to generate the depth-based effect. For example, during capture of the video, the identified portion (e.g., an object such as the first object 140) of the 3D environment is stored within the video's metadata with a timestamp that identifies the object of interest for a user during capture of the video. For example, a recorded video for a parent watching their child's game may contain metadata that would identify the object of interest for the user that captured the video (e.g., the parent), such that during replay, a depth-based effect (e.g., halo blurring effect) would be applied around the object of interest (e.g., the parent's child) based on that stored information (e.g., metadata) embedded within the video.

In some implementations, the depth-based effect varies over time based on identifying multiple portions of the 3D environment gazed upon at different times during the capture or the playback of the video. The depth-based effect may vary when switching from one object to another object. For example, in FIGS. 1-3, the user 102 may move their gaze from the first object (e.g., object 140) to the second object (e.g. object 142) at the back of the desk. For example, if a first user (a parent) is watching a particular player (e.g., their child) during a soccer game, his or her gaze is likely focused on that player. However, if a second user (another parent) watches the video, he or she may be focused on another player (e.g., their child) within the same video. The depth-based effect (e.g., halo effect) may then move to the second player based on the gaze of the second user.

Additionally, in some implementations, depth-based effect may vary by expanding the depth range that is in focus. For example, given the aforementioned example of watching players in a soccer game between two different parents, if a user focuses on a larger area (e.g., multiple players, or the players around the soccer ball), the depth-based effect may expand further than on one player and create a larger area of the effect based on the gaze characteristics.

In some implementations, a processor executes instructors stored in a non-transitory computer-readable medium to perform a method. The method may receive a video, wherein the video comprises a sequence of frames comprising depictions of a three-dimensional (3D) environment, wherein the video is a stereoscopic video comprising a pair of images for each frame of the video and metadata. During a playback of the video, the method may determine one or more depths of an identified portion of the 3D environment based on the stereoscopic video and the metadata and modify the video with a depth-based effect based on the one or more depths of the identified portion. The metadata may identify the identified portion of the 3D environment. The metadata may be generated based on tracking a gaze direction during capturing of the video. The method may, during the playback of the video, identify the portion of the 3D environment based on the metadata.

In some implementations, the method may identify an object of interest and a timestamp. during the playback of the video, the method may identify the portion of the 3D environment based on the metadata identifying the object of interest and the timestamp.

In some implementations, the method may modify the video by adding the depth-based effect around the identified object of interest.

In some implementations, the metadata may identify the one or more depths of the identified portion of the 3D environment. During playback such metadata may be used to modify the video, e.g., by adding a depth-based effect based on the one or more depths.

Figure 6:
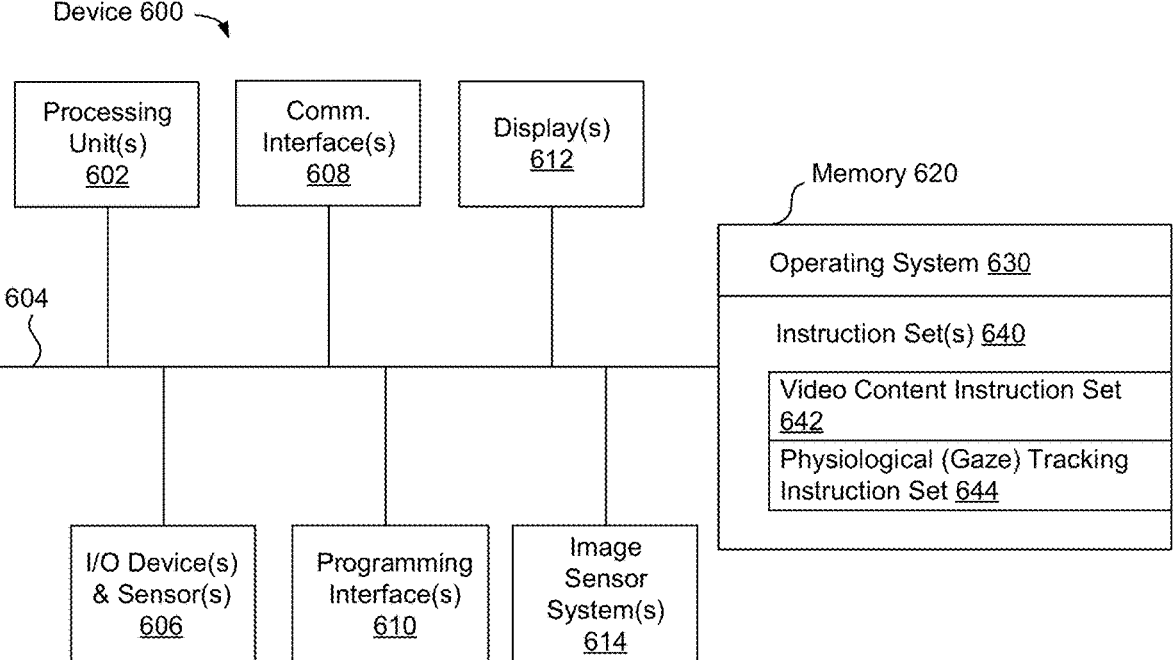
FIG. 6 is an example device in accordance with some implementations.

FIG. 6 is a block diagram of an example device 600. Device 600 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 600 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 600 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 600.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes a video content instruction set 642 and a physiological (gaze) tracking instruction set 644. The instruction set(s) 640 may be embodied as a single software executable or multiple software executables.

The video content instruction set 642 is executable by the processing unit(s) 602 to modify an image or a video with a depth-based effect. For example, the video content instruction set 642 obtains video data (e.g., image data of a physical environment such as the physical environment 105 of FIG. 1), obtains physiological data such as gaze data for a user (e.g., user 102), identifies a portion of the 3D environment depicted in the video based on the physiological data, determines a depth of the identified portion, and modifies the video with a depth-based effect (e.g., blurred halo effect) based on the depth of the identified portion. In some implementations, the video data that is modified is during playback of a video (e.g., method 400 of FIG. 4). Alternatively, the video data that is modified is during capture of a video (e.g., method 500 of FIG. 5).

In some implementations, the physiological tracking (e.g., eye gaze characteristics) instruction set 644 is executable by the processing unit(s) 602 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 7:
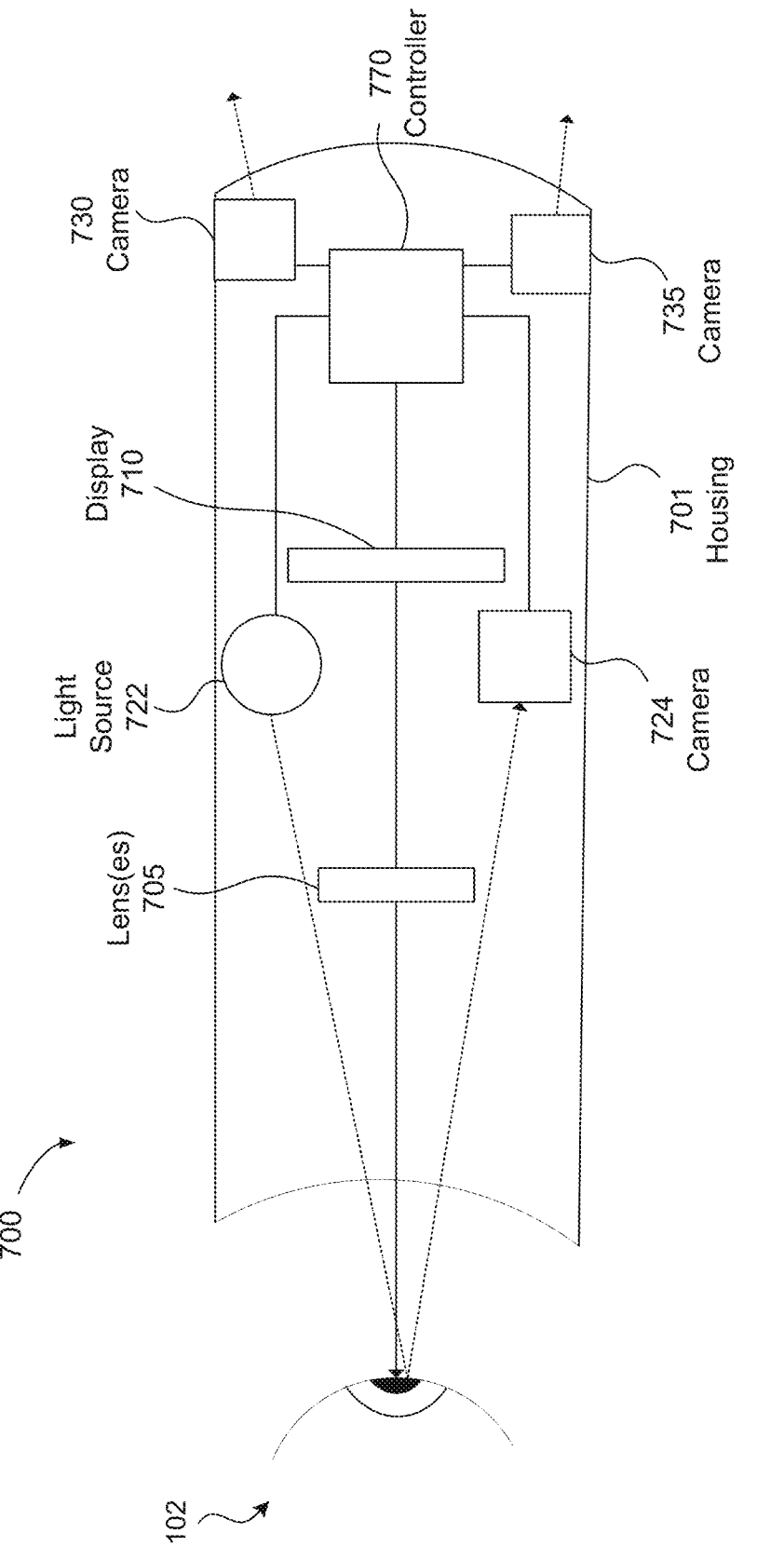
FIG. 7 illustrates an example head-mounted device (HMD) in accordance with some implementations.

FIG. 7 illustrates a block diagram of an exemplary head-mounted device 700 in accordance with some implementations. The head-mounted device 700 includes a housing 701 (or enclosure) that houses various components of the head-mounted device 700. The housing 701 includes (or is coupled to) an eye pad (not shown) disposed at a proximal (to the user 102) end of the housing 701. In various implementations, the eye pad is a plastic or rubber piece that comfortably and snugly keeps the head-mounted device 700 in the proper position on the face of the user 102 (e.g., surrounding the eye of the user 102).

The housing 701 houses a display 710 that displays an image, emitting light towards or onto the eye of a user 102. In various implementations, the display 710 emits the light through an eyepiece having one or more lenses 705 that refracts the light emitted by the display 710, making the display appear to the user 102 to be at a virtual distance farther than the actual distance from the eye to the display 710. For the user 102 to be able to focus on the display 710, in various implementations, the virtual distance is at least greater than a minimum focal distance of the eye (e.g., 7 cm). Further, in order to provide a better user experience, in various implementations, the virtual distance is greater than 1 meter.

The housing 701 also houses a tracking system including one or more light sources 722, camera 724, and a controller 780. The one or more light sources 722 emit light onto the eye of the user 102 that reflects as a light pattern (e.g., a circle of glints) that can be detected by the camera 724. Based on the light pattern, the controller 780 can determine an eye tracking characteristic of the user 102. For example, the controller 780 can determine a gaze direction and/or a blinking state (eyes open or eyes closed) of the user 102. As another example, the controller 780 can determine a pupil center, a pupil size, or a point of regard. Thus, in various implementations, the light is emitted by the one or more light sources 722, reflects off the eye of the user 102, and is detected by the camera 724. In various implementations, the light from the eye of the user 102 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 710 by looking at it), provide foveated rendering (e.g., present a higher resolution in an area of the display 710 the user 102 is looking at and a lower resolution elsewhere on the display 710), or correct distortions (e.g., for images to be provided on the display 710).

In various implementations, the one or more light sources 722 emit light towards the eye of the user 102 which reflects in the form of a plurality of glints.

In various implementations, the camera 724 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, head-mounted device 700 includes externally facing sensors (e.g., camera 730 and camera 735) for capturing information from outside of the head-mounted device 700. For example, to capture image data of the physical environment that the user 102 is viewing. The image data can include light intensity image data and/or depth data. For example, camera 730 (e.g., sensor 122 of FIG. 1) may be a video camera for capturing RGB data, and camera 735 (e.g., sensor 124 of FIG. 1) may be a depth sensor (e.g., a structured light, a time-of-flight, or the like) for capturing depth data.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device having a processor:
tracking a gaze direction during a capture or a playback of a video, wherein the video comprises a sequence of frames comprising depictions of a three-dimensional (3D) environment, and wherein the video is a stereoscopic video, each frame comprising a pair of images;
identifying a portion of the 3D environment depicted in the video based on the gaze direction;
determining one or more depths of the identified portion of the 3D environment;
modifying the video to enable replay of the video with a depth-based effect based on the one or more depths of the identified portion, wherein modifying the video comprises storing at least one of an identification of the identified portion and the one or more depths of the identified portion in association with the video; and
exporting the modified video as a monoscopic video having a single image for each frame.

2. The method of claim 1, wherein the one or more depths of the identified portion of the 3D environment is determined based on the stereoscopic video.

3. The method of claim 1, wherein the identified portion of the 3D environment is an object.

4. The method of claim 1, wherein the portion of the 3D environment is identified during capture of the video based on the gaze being directed towards the portion of the environment or towards a corresponding portion of a display that shows a live preview of the 3D environment being captured.

5. The method of claim 1, wherein the portion of the 3D environment is identified based on the gaze at a first time during the video, wherein the method further comprises:
identifying a second portion of the 3D environment based on the gaze at a second time during the video; and
modifying the video to enable replay of the video with a second depth-based effect based on a second depth of the second identified portion.

6. The method of claim 1, wherein identifying the portion of the 3D environment comprises:

identifying a plurality of objects based on the gaze direction during a period of time;

determining confidence values corresponding to likelihood that attention is directed to each of the plurality of objects based on the gaze direction during the period of time; and identifying the portion of the 3D environment by identifying an object of the plurality of objects based on the confidence values.

7. The method of claim 1, wherein modifying the video to enable replay of the video with a depth-based effect based on the one or more depths of the identified portion comprises modifying the frames of the sequence of frames to apply a depth of field effect and storing the modified frames as the modified video.

8. The method of claim 1, wherein the stored at least one of the identification of the identified portion and the one or more depths of the identified portion in association with the video can be used during replay to generate the depth-based effect.

9. The method of claim 1, wherein the depth-based effect varies over time based on identifying multiple portions of the 3D environment gazed upon at different times during the capture or the playback of the video.

10. The method of claim 1, wherein tracking the gaze direction during the playback of the video comprises tracking a pixel on a display that the gaze is focused upon.

11. The method of claim 1, wherein the 3D environment is a physical environment, a representation of a physical environment, or an extended reality (XR) environment that is presented to a user.

12. The method of claim 1, wherein the electronic device is a head-mounted device (HMD).

13. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

tracking a gaze direction during a capture or a playback of a video, wherein the video comprises a sequence of frames comprising depictions of a three-dimensional (3D) environment, and wherein the video is a stereoscopic video, each frame comprising a pair of images;

identifying a portion of the 3D environment depicted in the video based on the gaze direction;

determining one or more depths of the identified portion of the 3D environment;

modifying the video to enable replay of the video with a depth-based effect based on the one or more depths of the identified portion, wherein modifying the video comprises storing at least one of an identification of the identified portion and the one or more depths of the identified portion in association with the video; and exporting the modified video as a monoscopic video having a single image for each frame.

14. The device of claim 13, wherein the portion of the 3D environment is identified during capture of the video based on the gaze being directed towards the portion of the environment or towards a corresponding portion of a display that shows a live preview of the 3D environment being captured.

15. The device of claim 13, wherein the portion of the 3D environment is identified based on the gaze at a first time during the video, wherein the operations further comprise:

identifying a second portion of the 3D environment based on the gaze at a second time during the video; and modifying the video to enable replay of the video with a second depth-based effect based on a second depth of the second identified portion.

16. A non-transitory computer-readable storage medium, storing program instructions executable by one or more processors of an electronic device to perform operations comprising:

tracking a gaze direction during a capture or a playback of a video, wherein the video comprises a sequence of frames comprising depictions of a three-dimensional (3D) environment, and wherein the video is a stereoscopic video, each frame comprising a pair of images;

identifying a portion of the 3D environment depicted in the video based on the gaze direction;

determining one or more depths of the identified portion of the 3D environment;

modifying the video to enable replay of the video with a depth-based effect based on the one or more depths of the identified portion, wherein modifying the video comprises storing at least one of an identification of the identified portion and the one or more depths of the identified portion in association with the video; and exporting the modified video as a monoscopic video having a single image for each frame.

* * * * *